United States Patent [19]

Dunthorn

[11] Patent Number: 4,914,624

[45] Date of Patent: Apr. 3, 1990

[54] VIRTUAL BUTTON FOR TOUCH SCREEN

[76] Inventor: David I. Dunthorn, 908 W. Outer Dr., Oak Ridge, Tenn. 37830

[21] Appl. No.: 191,227

[22] Filed: May 6, 1988

[51] Int. Cl.$^4$ .............................................. G06F 3/02
[52] U.S. Cl. ................................ 364/900; 364/927.2; 364/927.64
[58] Field of Search .......................... 364/200, 300, 900

[56] References Cited

U.S. PATENT DOCUMENTS

| | | | |
|---|---|---|---|
| 3,911,215 | 10/1975 | Hurst et al. ............................ | 178/18 |
| 4,220,815 | 9/1980 | Gibson et al. .......................... | 178/18 |
| 4,763,356 | 8/1988 | Day, Jr. et al. ................... | 364/900 X |

OTHER PUBLICATIONS

Elographics, *Prelim. IntelliTouch Systems Manual*, 3/19/88, pp. 1–10.

*Primary Examiner*—Raulfe B. Zache
*Attorney, Agent, or Firm*—David B. Harrison

[57] ABSTRACT

Apparatus and methods for creating a virtual push button comprise a touch sensitive orthogonal data field input device useably connected within a computing system in which a touch action at the device generates a stream of data related to the location within the field of the touch action. The orthogonal data field input device includes circuitry for sensing the onset of a first touch action and for monitoring the continuity thereof; and the computing system including a second condition sensor for sensing the occurrence of a second predetermined condition; and, computing circuitry for generating the virtual push button upon the concurrence of touch action continuation and the occurrence of the second predetermined condition.

22 Claims, 2 Drawing Sheets

VIRTUAL BUTTON FOR TOUCH SCREEN

FIELD OF THE INVENTION

The present invention relates to methods and apparatus for data input to computing systems. More particularly, the present invention relates to methods and apparatus for creating a virtual button for a touch screen or touch pad orthogonal field data input device.

BACKGROUND OF THE INVENTION

Touch pads and touch screens responsive to localized depression pressure have been provided to create "buttons" for data input. A touch pad device is disclosed, for example, in U.S. Pat. No. 3,911,215; and, a transparent touch screen for overlayment and use with the display screen of a cathode ray tube is disclosed, for example, in U.S. Pat. No. 4,220,815, the disclosures of both of these patents being incorporated by reference herein.

These previously patented devices rely upon resistive sheets in which uniform orthogonal electric fields are generated in two-phase sequences, for example, as shown in FIG. 1 of the referenced '215 patent. When a low resistance or ground connection is established at a particular location on the sheet, as by depressing an overlying, low resistance ground or signal return sheet into electrical contact with the resistive sheet, precise orthogonal field (x,y) pinpointing of the location of depression may be provided. Thus, these prior devices have been utilized in conjunction with a computer system to create "push-buttons". When a particular push-button (i.e. location on the resistive sheet) is depressed ("touch"), or released ("untouch"), the computer has sensed this occurrence and has responded operationally thereto.

Other technologies have been applied to create touch screens and pads, including surface accoustic wave technology; and these screens and pads have also been used with computing systems to create push-buttons. The surface accoustic wave touch screen has the additional capability of reporting a z-coordinate indicative of the velocity or force with which the screen or pad is touched.

Traditionally, touch screens or pads have accomplished push-button sensing either through a touch, i.e. when the operator's finger or a stylus first touches the screen; or, an untouch, i.e. when the finger or stylus is released from the screen or pad. "Touch" is the most natural action for a novice user, because it represents activation on contact, just like the expected action of a conventional electromechanical push-button. For example, with a touch screen implementation, a user touches a labelled, delineated area on the screen, and a resulting action and acknowledgement are then given e.g. by an appropriate display on the screen.

For "untouch", the touch step (which of course must come first) usually initiates some form of visual feedback, such as highlighting a screen area or option. The area or option is not actually selected to perform its action until the user "untouches" the screen. Thus, with "untouch" the slightly more experienced user can move finger or stylus on the screen to be sure the proper area is highlighted and then untouch or remove finger or stylus in order to complete the selection process. This approach enables a far greater precision in selection of desired areas on the screen.

The "touch" and "untouch" procedures are satisfactory for many applications, but they have significant shortcomings. Often it is very desirable or necessary to display the visual feedback following a user's finger around the screen while not forcing the user actually to make a selection upon the untouch action. To achieve this feedback using normal touch screen operations, it is necessary to completely divorce the untouch action from selection. An operation with visual feedback is first used to determine a position on the screen, but the untouch action does not cause a selection to be made. A second touch/untouch operation is then required on the screen (or via some other input device such as a keyboard) in order to perform the select operation.

This prior requirement for two disparate actions to perform a single selection is not satisfactory. In order to accomodate the occasional time when an untouch action will not lead to a selection, the user's attention must be diverted for each such action. This inconvenience becomes intolerable when dealing with a sequence of operations as typically encountered in computer aided design (CAD) or even in simple word processing applications. One way of further illustration of this inconvenience is by drawing an analogy to a hypothetical typewriter which would require the typist to strike a ribbon advance key after each symbol key was struck merely to advance the ribbon during typing, a function automatically performed by conventional typewriters.

This inconvenience in prior art touch screens and touch pads has not been experienced with other position-reporting devices, such as computer "mice", "tablets", and "light pens" which usually have actual push-buttons present on the mechanism manipulated by the user's hand during operations. Thus, the user is able to manipulate a computer mouse to a desired orthogonal (x,y) position typically followed by a visual cursor on the display screen and then to actuate one of a plurality of switches on the mouse to initiate or discontinue a particular function.

Thus, a hitherto unsolved need has arisen for the provision of a "virtual" push button for use with touch screens or touch pads which functionally extends the capability thereof to match the capability of other position reporting devices, such as computer "mice", "tablets", and "light pens" which usually have electromechanical push-buttons present on the mechanism for manipulation by the user's hand during positioning operations thereof.

SUMMARY OF THE INVENTION WITH OBJECTS

A general object of the present invention is to overcome functional and operational drawbacks hitherto associated with touch screen and touch pad devices by enabling generation of virtual push-buttons as a function of activation of at least one actual push button location on the screen or pad.

A specific object of the present invention is to extend the functionality of touch screen and touch pad orthogonal data input devices to match that achievable with computer mice, tablets, light pens and the like.

In accordance with the principles of the present invention, methods and apparatus are provided for creating a virtual push button at a touch sensitive orthogonal field data input device used in conjunction with a computing system in which a touch action at the device generates a stream of data related to the location within the field of the touch action. The methods and the apparatus embodying the methods carry out the steps of:

sensing the onset of a first touch action at the device and monitoring the continuity thereof, sensing the occurrence of a second predetermined condition, generating the virtual push button upon the concurrence of touch action continuation and the occurrence of the second predetermined condition.

In one specific aspect of the present invention, the step of sensing the occurrence of the second predetermined condition comprises the step of sensing the onset of a second touch action at the device.

In a second specific aspect of the present invention, the step of sensing the onset of a second touch action at the device includes the step of determining the direction of the second touch action relative to the location of the first touch action and wherein the virtual push-button is generated as a function of the determined direction.

In a third aspect of the present invention, the step of sensing the onset of a second touch action at the device includes the step of determining the distance of the second touch action from the location of the first touch action and wherein the virtual push-button is generated as a function of the determined distance.

In a fourth aspect of the present invention, the step of sensing the occurrence of a second predetermined condition comprises sensing an increase in applied pressure at the touch point.

In a fifth aspect of the present invention, the step of sensing the occurrence of the second predetermined condition comprises the step of detecting elapse of a predetermined time interval and detecting an untouch action at the first location after the predetermined time interval has elapsed.

In a sixth aspect of the present invention, the step of sensing the occurrence of the second predetermined condition comprises the steps of detecting elapse of predetermined time intervals and comprising the further step of generating and displaying to the user a sequence of virtual push-buttons with a virtual push-button being displayed during each time interval, the step of generating the virtual push button occurring upon detection of an untouch action at the first location during display of a preferred one of the virtual push-buttons.

In a seventh aspect of the present invention, the step of sensing the occurrence of the second predetermined condition comprises the step of sensing an input at another input device functionally connected to the computing system.

In an eighth aspect of the present invention, the step of sensing an input at another input device comprises the step of sensing actuation of a key of a keyboard device.

These and other objects, advantages and features of the present invention will be more fully understood and appreciated upon considering the following detailed description of preferred embodiments, presented in conjunction with the accompanying drawings.

DETAILED DESCRIPTION OF PREFERRED EMBODIMENTS

It has been discovered that when a resistive touch screen or pad of the type described in the referenced patents is touched in two places at the same time, the screen returns a single position which is located about half way between the two positions actually being touched. This untouched, single position is therefore available to serve as a virtual push-button.

Also, when the screen or pad is being touched at one point and is then touched at another point as well, there is a sudden large change or discontinuity in reported position which is more sudden and discontinuous than would be produced by a rapid motion of the finger or stylus across the screen or pad. Since there will have been no detected untouch action prior to this large, discontinuous change, its occurrence is distinct, and may therefore be distinguished as abnormal from other functional activities at the touch screen/touch pad. Therefore, the action of touching the screen/pad at a second touch point without first releasing a still active first touch point thereby creates one form of virtual push-button.

Although the present invention has been developed for use with a glass resistive touch screen, the present techniques may be effectively used with any touch screen or touch pad which, when touched at two different points, will return a position significantly different than for either point actually being touched.

The activation of a virtual push-button not only indicates that a sudden change in position has take place, but also reports the direction and amount of that change. Thus, it is easily possible to determine whether the second touch was above, below, to the right or to the left of the original touch. Finer distinctions of angular direction are also easily implemented In particular, the implementation of four distinct virtual buttons, one for each of the cardinal directions, is both easy to implement and easy for an operator to remember. It is also possible to differentiate different virtual push-buttons in the same direction on the basis of the distance between the two simultaneous touch actions giving rise to the virtual push-button.

In addition to enabling abortion of a normal touch-untouch operation, virtual push-buttons have other very useful properties. On a touch screen or touch pad, actual or assigned push buttons are usually defined by establishment of a function (push-button) at a particular location. Usually, visual information is provided to identify each actual button's position and function. Touch screens in particular are often implemented so that the visual information presented at the screen changes as required in order to match redefined button positions. However, within any given visual presentation, the location of each actual push button will be fixed.

A virtual push-button, on the other hand, is not fixed to any position on the screen, but is defined at a position related to the positions of two simultaneous touch actions giving rise to the virtual push-button. Thus, virtual push buttons may coexist with and even overlie actual push button locations without creating any interference with the functions normally assigned to those actual push button locations. This feature is particularly useful for buttons which are to retain common and useful functions regardless of the information presented on the screen; functions such as "cancel" and "confirm".

Since the virtual push button is by definition an abnormal or discontinuous action which readily lends itself to "abort" or "cancel" operations, it is apparent that this principle may be extended to other characteristics and usages of the touch screen or touch pad. For example, timing may be considered as a control factor in the operation of touch screens and touch pads. Normally, once a selection has been accurately located by using visual feedback, the time interval until the accompanying untouch selection action occurs is quite short. It is therefore possible to define an abnormally long time interval as another variety of virtual push-button.

For example, if an abnormally long time interval elapses between the touch action and the untouch action, this inordinate delay may be used to cancel the selection function of the untouch action. If accompanied by visual feedback, this timeout feature may become a powerful tool in its own right. For example, the visual feedback may be made to cycle through a sequence of patterns representing different functional push-buttons whereby the user may select a particular function or activate a particular push-button by performing an untouch action while the desired visual pattern is currently being presented. In such an operation the patterns are not restricted to the touch point, but they may be visual signals displayed elsewhere on the screen, off the screen, or they may be other forms of signals such as aural or voice synthesized signals presented to the user via appropriate transducer devices. Any signal capable of being perceived by the user may be employed with touch-untouch action time intervals in order to provide a successive series of virtual push-buttons in accordance with the principles of the present invention.

Furthermore, with touch screens which sense the level of touch pressure at, as well as the orthogonal coordinates of, the touch location, the amount of sensed touch pressure may be used in a manner analogous to time in the immediately preceding example, with an increase in pressure being considered an abnormal condition producing a virtual push-button. Further increases in pressure, especially if accompanied by feedback to the user from the computing system, such as a visual display, can be sensed as other distinct virtual push-buttons. Untouch action then provides selection of the virtual button defined and determined by the greatest pressure sensed.

Virtual push-buttons give touch screens and touch pads the same range of capabilities as other position-reporting devices, such as computer "mice", "tablets", and "light pens" which usually have electromechanical push-buttons present on the mechanism which are available for manipulation by the user's hand during positioning operations.

Figure 1:
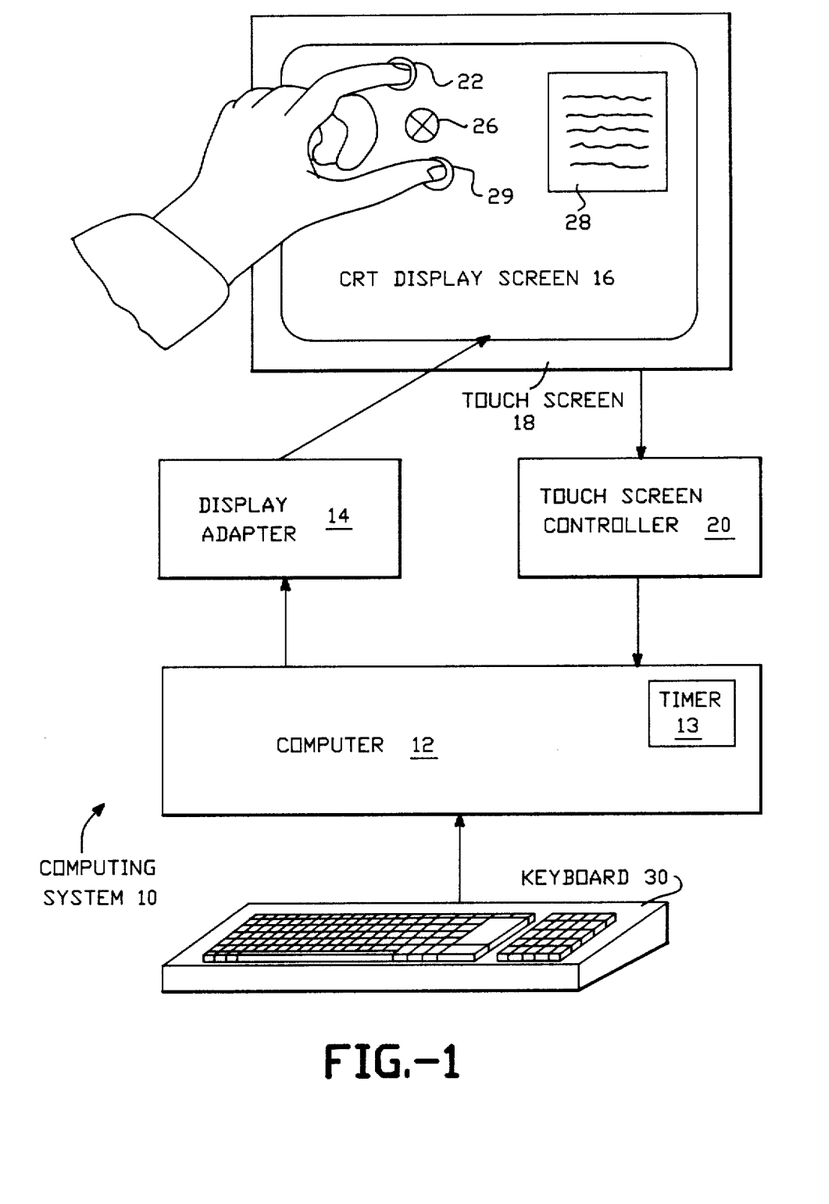
FIG. 1 is a somewhat diagrammatic block diagram of a computing system including a touch screen input/display device configured in accordance with the principles of the present invention.

With reference to FIG. 1, a computing system 10 includes a computer 12 such as an IBM Personal Computer (tm). In addition to conventional CPU, memory, mass storage and input/output interface elements connected by internal data and control buses, the computer 12 may include an internal timer established by software or hardwrre for marking predetermined time intervals. A display adaptor 14 is connected to the bus of the computer 12 and is also connected to drive a suitable display device such as a CRT monitor having a display screen 16. A transparent touch screen 18, for example of the type described in the referenced U.S. Pat. No. 4,220,815, overlies the display screen 16 and senses touch and untouch actions performed e.g. by the index finger and thumb of a user. The touch screen 18 is connected electrically to a touch screen controller 20, which is in turn connected to the bus of the computer 12.

The touch screen controller 20 provides the drive voltages for the x and y axes of the screen 18, converts the analog signals from the touch screen 18 into digital coordinates for x and y, and transmits these coordinates to the host processor 12. Since the touch screen 18 has analog outputs, the coordinate (x,y) resolution is determined by the resolution of the analog to digital converter within the controller 20. With a twelve bit analog to digital converter, the screen resolution may be up to 4000 by 4000 points across the active surface of the touch screen 18. The controller 20 may be polled or interrupt driven, and it generates coordinate pairs as long as the touch screen 18 is being touched.

Preferably, the touch screen 18 may be an Elographics ACCUTOUCH (tm) E274 or E270 Touch Screen, and the controller 20 may be an Elographics E271-141 controller which is configured as a half slot expansion card for insertion into a bus connector of the personal computer 12. In order to work with the software appearing at the end of this document, the E271-141 controller may be switch-configured for 12 bit resolution, with streaming output to the host 12. Other configurations are easily implemented with minor changes in the software. Other touch screens, such as the Elographics DURATOUCH (tm) resistive membrane touch screen or the Elographics SAW (surface accoustic wave) Touch Screen and other Elographics controllers, including the E271-140 and E271-60 work equally well with the present invention.

As illustrated in FIG. 1, the user's forefinger may touch the screen 18 at a location 22. When this happens, the touch screen controller derives orthogonal (x,y) coordinate information to fix the location 22 and sends an interrupt to the computer 12. The host processor within the computer 12 then enters a series of service routines. These routines sense the location 22 as an actual button and generate predetermined graphical information at the screen 16 in response to the touch action at the location 22. If the user's forefinger is removed from the location 22, then an untouch action is detected, and this action may be used to select the function or operation called to the screen when the location 22 was originally touched.

Now, if before the forefinger is removed from the location 22, the user's thumb is brought into contact with the screen 16 at a location 24, a virtual push button at location 26 is thereby established, and this virtual push-button may operate e.g. to cancel the function originally called up by depressing the location 22 of the touch screen 18, or it may have some other preestablished function or consequence.

Alternatively, the touch action of the forefinger at the location 22 may set a timer which, after a predetermined normal untouch period, causes a menu 28 to begin to cycle through program options or choices for example. When a particular option or choice of interest to the user becomes displayed in the menu area 28, an untouch action at the location 22 then causes that particular choice to be selected. In this way the virtual push button is established in the temporal, as opposed to the spatial, domain.

Alternatively, the screen 16 may be of the surface accoustic wave type, and increased pressure of the touch action of the forefinger at the location 22 may be sensed as a second predetermined condition, thereby establishing the presence of a virtual push-button.

The computing system 10 may conventionally be provided with a keyboard 30 for text entry. One or more of the keys of the keyboard may be used in conjunction with the touch screen 18 to provide a virtual push-button. For example, during continuation of the touch action at the location 22, a key of the keyboard 30 may be depressed, resulting in the generation of a virtual button which may produce a predetermined display upon the screen 16.

Figure 2:
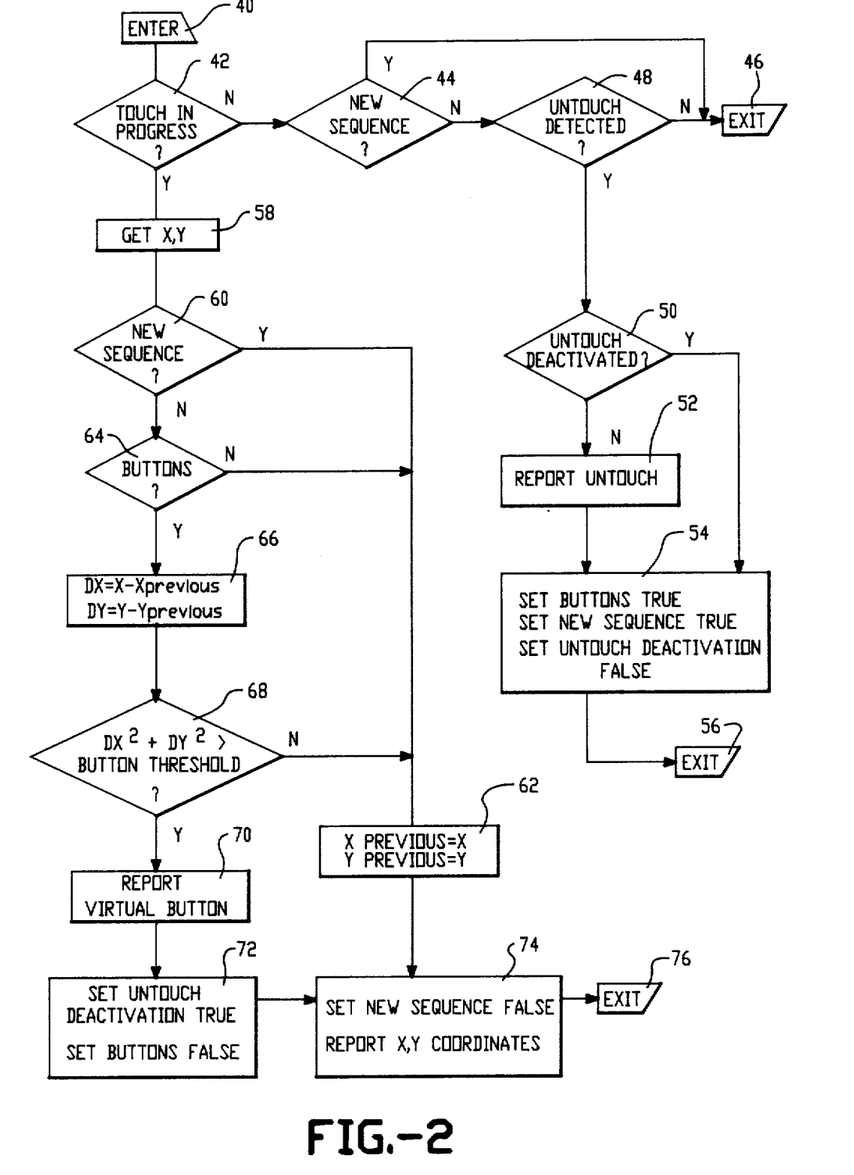
FIG. 2 is a flowchart of one preferred embodiment of the method of the present invention when used in conjunction with the hardware depicted in FIG. 1.

FIG. 2 sets forth a flow chart illustrative of a single virtual push-button in accordance with the principles of the present invention. The virtual push-button is established by detection of "large" distance changes in button location. The FIG. 2 flowchart also includes untouch detection. The flow sequence charted in FIG. 2 may be activated either by an interrupt from the touch screen controller 20 or by a timer established within the computer 12. If a timer is used, the time interval for activation is set according to the response time desired and other requirements of the system.

For example, typical touch controllers are capable of producing streaming data output of touch coordinates at a rate around 100 points per second. Individual designs may easily vary from less than one fourth to over four times the 100 points per second rate. The routine described by the FIG. 2 flowchart is typically activated by an interrupt each time a coordinate pair is generated. Thus, interrupts are continuous at the controller-determined rate during a touch operation, and cease completely when no touch is sensed. If the controller is not designed to detect and report the end of a touch operation (untouch action), it is helpful to activate the routine via a timer interrupt as well as the controller interrupt, in order to detect when the controller has ceased to generate interrupts. Timer interrupt frequency is selected to enable reliable untouch detection, which typically requires about 50 milliseconds and may easily vary from less than one fourth to four times that interval, depending upon the specific controller, screen and operating environment.

The FIG. 2 control program is entered at an entry point 40 and a logical node 42 determines whether a touch is in progress. Initially, the flag to "deactivate untouch" is false and the "new sequence" and "buttons" flags are true. If a touch is not in progress, as tested at the node 42, a logical node 44 determines if the present sequence is a "new sequence" in order to check to see whether the associated untouch can be reported yet. If a new sequence is detected at the node 44, the program is exited at an exit point 46. If not, a logical node 48 determines whether untouoh has been detected. If not, the program is exited at the exit point 46. If so, according to the "deactivate untouch" flag as established at a logical node 50, the untouch is either reported at an output block 52 or discarded. In either case, a process block 54 sets the "deactivate untouch" flag to false, and the "buttons" and "new seuence" flags to true. Setting the "new sequence" flag true prevents the same untouch from being reported more than once as well as insuring the proper initiation of the next sequence of touch reportings. The program is then exited at an exit point 56.

If a touch is in progress as tested at the node 42, the x, y coordinate values are obtained from the touch screen controller 20 at a process block 58. A check is made at a logical node 60 to see if a "new sequence" is starting. If so, there is no check made for virtual button operation, since there is no reference position from which to measure changes in distance; and the program execution proceeds directly to a process block 62 in which the x value is stored in an x previous value register and the y value is stored in a y-previous-value register.

If the present sequence is not a "new sequence" as determined at the logical node 60, then a "buttons" flag is checked at a logical node 64. If the "buttons" flag is not enabled, then program execution proceeds directly to the process block 62. If the "buttons" flag is set, then a process block 66 calculates a Delta x as equal to the present x value minus the previous x value, and a Delta y as equal to the present y value minus the previous y value. The process block 66 also calculates the sum of Delta x square and Delta y square.

While the FIG. 2 program calculates circular distance ($Dx^2 + Dy^2$), in some situations it may be preferable to use other values such as absolute distance $|Dx|$ or $|Dy|$ for the comparison made at the process block 66.

A logical node 68 determines whether the sum of Delta x square and Delta y square is larger than a predetermined virtual button threshold value. If not, the program execution proceeds directly to the process block 62. If so, then a virtual button is reported at a process block 70, and the "deactivate untouch" flag may be set true and the "buttons" flag (tested at node 64) is set false at a block 72. The "buttons" flag is set false at this block 72 to prevent multiple activations of the same button. The "deactivate untouch" flag is usually set true at the block 72 since it is usually desirable to ignore untouch action when a virtual button is first activated, but this decision is a matter of program convention and is not necessary.

In any case, when program execution leaves either the process block 62 or the process block 72, the "new sequence" flag (tested at node 60) is set false and the x and y coordinates are reported at a process block 74, and the program is then exited at an exit node 76; to be repeated at the next interrupt or time out from the internal timer.

Here follows a program listing in Microsoft Macro Assembler language for the Intel 8086/8088 series microprocessors. In addition to the program flow charted in FIG. 2, the following program also implements untouch detection and the distinction of virtual buttions in the four cardinal directions. One of the buttons is intentionally made more difficult to activate so that it cannot be pressed by accident.

```
;       TOUCH SCREEN INTERRUPT WITH VIRTUAL BUTTON ANALYSIS
;            Written in Microsoft Macro Assembler
;                for the Intel 8086/8088 series
;                        microprocessors
;
;       This is an example of a reduction to practice.
;       The "Virtual Button" technique is directly applicable
;       other computers, other languages, and may be used in
;       places other than an interrupt routine.
;
;       Screen is the interrupt service routine for the
;       Elographics touch screen using a model 141 controller
;       in an IBM-PC or similar computer. It responds to
;       screen interrupts, reads the data as required, and
;       does "Virtual Button" analysis, since the interrupt
;       is one place certain to see each successive reading.
;       This routine requires 12-bit, streaming input from
;       the model 141 controller.
;

_TEXT   SEGMENT BYTE PUBLIC 'CODE'
        ASSUME  CS: _TEXT, DS: NOTHING, SS: NOTHING, ES: NOTHING

SCREEN  PROC    FAR
        STI
        PUSH    DX
        PUSH    AX
        PUSH    DS
        MOV     AX,CS       ;Set up DS=CS for easy memory access
        MOV     DS,AX
        ASSUME  DS:_TEXT MOV     DX,ELOPORT  ;Port address of 141
        ADD     DX,2
        IN      AL,DX       ;Get status from 141
        TEST    AL,40H      ;Test X data
        JZ      GET_Y       ;Get Y if not
        SUB     DX,2        ;Back to first port
        IN      AL,DX       ;Get X high byte, 12 bit mode
        MOV     AH,AL
        INC     DX
        NOP                 ;Timing waits for very fast machines
        NOP
        IN      AL,DX       ;And X low byte
        SHR     AX,1
        SHR     AX,1
        SHR     AX,1
        SHR     AX,1        ;Shift right 4 to normal word
        MOV     TEMPX,AX            ;Save it for later
        MOV     AL,NTCOUNT          ;Timer count
        MOV     USE_FLAG,AL         ;Reset use flag
        JMP     SCREXIT     ;And exit the interrupt ; The model 141 generates two interrupts, one for X, then
; another for Y. The X only stores data in TEMPX above
; and resets timer and event flags. Y follows through
; with the complete analysis.

GET_Y:  SUB     DX,2        ;Back to port
        IN      AL,DX       ;Get Y high byte
        MOV     AH,AL
        INC     DX
        NOP
```

```
       NOP
       IN      AL,DX         ;And Y low byte
       SHR     AX,1
       SHR     AX,1
       SHR     AX,1
       SHR     AX,1          ;Shift right 4, normal word
       PUSH    BX            ;Save regs for temporary store
       PUSH    CX
```
; Calculate the change in Y (delta Y) and the change
; in X (delta X) from the previous values

```
       MOV     BX,AX
       SUB     BX,LASTY      ;BX = delta Y
       MOV     LASTY,AX      ;Save new Y
       MOV     AX,TEMPX
       MOV     CX,AX
       SUB     CX,LASTX      ;CX = delta X
       MOV     LASTX,AX      ;Get a matching pair
       MOV     AL,NTCOUNT    ;<----------|  Timer count
       CMP     UNWAIT,1      ;<----------|  Test acting on stream
       MOV     UNWAIT,1      ;THESE ARE  |  Waiting for untouch
       MOV     USE_FLAG,AL   ;TIED       |  Reset use flag
       JNE     SCREXO        ;<----------|  Jump if not in stream
       CMP     UCANCEL,0     ;One button at a time
       JNE     SCREXO
```

Button Analysis

If there has been a "large" change in co-ordinate between
calls at this level, it means a "button press" - analyse
to find large change and then determine which button.

```
       XOR     AX,AX         ;Assume both deltas positive
                             ;AX holds sign bits for X and Y
       CMP     BX,0          ;Test delta Y (BX)
       JGE     Z1            ;Skip if delta Y is positive
       NEG     BX            ;Make delta Y positive
       ADD     AX,2          ;And set Y sign bit in AX
Z1:    CMP     CX,0          ;Test delta X (CX)
       JGE     Z2            ;Skip if delta X is positive
       NEG     CX            ;Make delta X positive
       INC     AX            ;And set X sign bit in AX
Z2:    CMP     CX,BX         ;Select the larger of delta X, Y JGE     X1            ;Skip if delta X larger
       CMP     BX,MAXDEL     ;Test size of delta Y
       JL      SCREXO        ;Skip if change not large enough
```

Shift in X or Y was large enough to trigger a button
Now a selection is made, illustrating selection from
multiple buttons

```
              4                     determine
         2        3                 which
              1                     one was triggered TEST    AX,2          ;Was delta Y negative?
       JZ      YPOS          ;No, skip
       MOV     BUTTON,1      ;Set first button
       JMP     SHORT SCREX1
```

Button 4 (delta Y positive) is set up as a special
difficult-to-activate button to insure it cannot be

```
;         accidentally pressed, illustrating variable strength
;         buttons YPOS:    MOV    CL,BUTMUL4      ;Shrink the apparent
         SHR    BX,CL           ;Fourth calibrate button
         CMP    BX,MAXDEL       ;Takes a multiple of the distance
         JL     SCREXO          ;Or don't activate
         MOV    BUTTON,4        ;Set fourth button
         JMP    SHORT SCREX1
;        X (horizontal) buttons
X1:      CMP    CX,MAXDEL       ;Test size of delta X
         JL     SCREXO          ;Skip if not "large" change
         TEST   AX,1            ;Was delta X negative?
         JZ     XPOS            ;No, skip
         MOV    BUTTON,2        ;Set first button
         JMP    SHORT SCREX1
XPOS:    MOV    BUTTON,3        ;Set fourth button
;        In this case, we want the next untouch, which is
;        essentially a select button to be null whenever
;        a virtual button is pressed. This is a convention
;        which can be reversed.
SCREX1:  MOV    UCANCEL,1       ;A Button was touched, cancel
                                ;next untouch
SCREXO:  POP    CX
         POP    BX              ;Recover stack
SCREXIT: CLI
         MOV    AL,20H
         OUT    20H,AL          ;Re-enable interrupt
         POP    DS
         POP    AX              ;Restore stack
         POP    DX
         IRET                   ;Return from interrupt

OLD_TICK LABEL  DWORD
TICK_OFF DW     0
TICK_SEG DW     0

;  Working memory for the interrupts

LASTX    DW     -1              ;X is empty
LASTY    DW     0
TEMPX    DW     0
UNTOUCH  DW     0
UNWAIT   DB     0
USE_FLAG DB     0
BUTTON   DW     0               ;Button press number
UCANCEL  DB     0               ;Untouch cancel flag ;  The following five parameters can be altered as required
;  to adjust the sensitivity of the buttons and the other
;  operations of the interrupt.

MAXDEL   DW     100             ;Maximum delta X or Y for button
BUTMUL4  DB     5               ;Shift multiplier for button 4
NTCOUNT  DB     2               ;Timeout count
ELOPORT  DW     280H            ;Port number
ELOINT   DW     0               ;Interrupt number ;        TICK is an interrupt routine for the IBM-PC which will
;        be triggered 18.2 times a second, chaining into
;        INT 1CH. We need to do this to detect "untouch"
;        since the 141 controller does not tell us. We do this
;        by decrementing the counter USE_FLAG, which the SCREEN
;        interrupt resets to NTCOUNT each time it receives data.
```

```
;           Thus when USE_FLAG becomes zero, we have been waiting
;           for awhile with no signal; an untouch is indicated.
;
TICK:
            PUSH    DS
            PUSH    CS              ;Set DS=CS
            POP     DS
            ASSUME  DS:_TEXT CMP     UNWAIT,0
            JZ      TICK_EXIT       ;Not waiting for untouch
            DEC     USE_FLAG        ;See how long we have waited
            JNZ     TICK_EXIT       ;Untouch not confirmed yet
            MOV     UNWAIT,0        ;Have untouch, no longer waiting
            CMP     UCANCEL,0       ;Was untouch cancelled?
            MOV     UCANCEL,0       ;Reset anyway
            JNE     TICK_EXIT       ;Skip if untouch cancelled
            MOV     UNTOUCH,1.      ;Untouch true TICK_EXIT:
            POP     DS              ;No event, no service ;           It is assumed here that OLD_TICK has been previously
;           set up with a link back into the 1CH timer interrupt
;           this is logically equivalent to an IRET
            JMP     DWORD PTR CS:OLD_TICK ;Chain into original interrupt
;           IRET

SCREEN      ENDP

PUBLIC  _getgen
X           EQU     4               ;Sets X to offset of Microsoft small args ;           getgen - get information from the interrupts
;
;           This is an example of a routine to interface the above
;           interrupts to a C language calling program, which might
;           reference:
;
;           getgen(&x,&y,&untouch,&button)
;
;           These are the screen x, y, and whether there has been
;           an untouch or button press since the last request.
;           If x is negative, then no data were obtained since
;           the previous values.
;
_getgen     PROC    NEAR
            PUSH    BP
            MOV     BP,SP           ; set our argument pointer
            CLI                     ;Make sure we have a valid set
            MOV     AX,CS:LASTX
            MOV     CX,CS:LASTY
            MOV     DX,CS:UNTOUCH
            MOV     BX,CS:BUTTON
            MOV     CS:BUTTON,0     ;Reset button
            CMP     DX,0            ;Test Untouch
            JZ      GET0
            MOV     CS:UNTOUCH,0
            MOV     CS:LASTX,-1     ;Turn off untouch indicator
GET0:       PUSH    BX
            STI
            MOV     BX,WORD PTR [BP+X]
```

```
MOV     WORD PTR [BX],AX ; X
MOV     BX,WORD PTR [BP+X+2]
MOV     WORD PTR [BX],CX ; Y
MOV     BX,WORD PTR [BP+X+4]
MOV     WORD PTR [BX],DX ; Untouch
MOV     BX,WORD PTR [BP+X+6]
POP     DX               ;Recover Button
MOV     WORD PTR [BX],DX ; Button

MOV     SP,BP
POP     BP
RET

_getgon  ENDP
_TEXT    ENDS
         END
```

To those skilled in the art to which the present invention pertains, many widely differing embodiments and arrangements will be suggested upon consideration of the foregoing. The description of presently preferred embodiments herein is by way of illustration only, and should not be construed as limiting the present invention, the scope of which is more particularly set forth by the following claims.

I claim:

1. A method for creating a virtual push button at a touch sensitive orthogonal data field input device used in conjunction with a computing system in which a touch action at the device generates a stream of data related to a location within a field of the touch action, the method including the steps of:
sensing an onset of a first touch action at the device and monitoring a continuity thereof,
sensing an occurrence of a second predetermined condition,
generating the virtual push button upon concurrence of sensed touch action continuation of the first touch action and sensed occurrence of the second predetermined condition.

2. The method set forth in claim 1 wherein the step of sensing the occurrence of the second predetermined condition comprises the step of sensing an onset of a second touch action at the device.

3. The method set forth in claim 2 wherein the step of sensing an onset of a second touch action at the device includes the step of determining a direction of the second touch action relative to a location of the first touch action and wherein the virtual push-button is generated as a function of the determined direction.

4. The method set forth in claim 2 wherein the step of sensing an onset of a second touch action at the device includes the step of determining a distance of the second touch action from the location of the first touch action and wherein the virtual push-button is generated as a function of the distance so determined.

5. The method set forth in claim 4 wherein the step of determining a distance of the second touch action from the location of the first touch action comprises the steps of:
determining and recording orthogonal coordinates of the first touch action;
determining and recording orthogonal coordinates of the second touch action; and wherein the step of generating the virtual push button comprises the steps of:
obtaining Delta x and Delta y difference values from the determined orthogonal coordinates of the first and second touch actions;
calculating a factor related to Delta x and Delta y, and,
comparing the calculated factor with a preestablished virtual push-button distance value.

6. The method set forth in claim 5 wherein the step of calculating a factor related to Delta x and Delta y comprises the step of calculating a sum of Delta x squared and Delta y squared.

7. The method set forth in claim 5 wherein the step of calculating a factor related to Delta x and Delta y comprises the step of deriving absolute values for Delta x and Delta y.

8. The method set forth in claim 1 wherein the step of sensing an occurrence of the second predetermined condition comprises the step of detecting elapse of a predetermined time interval and detecting an untouch action at a location of the first touch action after the predetermined time interval has elapsed.

9. The method set forth in claim 1 wherein the step of sensing an occurrence of the second predetermined condition comprises the steps of detecting elapse of predetermined time intervals and comprising the further step of generating and displaying to a user a sequence of virtual push-buttons with a virtual push-button being displayed during each time interval, the step of generating the virtual push button occurring upon detection of an untouch action at a location of the first touch action during display of a preferred one of the virtual push-buttons.

10. The method set forth in claim 1 wherein the step of sensing an occurrence of the second predetermined condition comprises the step of sensing actual pressure applied at the first touch action and wherein the step of generating the virtual push button occurs when comparison of sensed actual pressure with a prestored value.

11. The method set forth in claim 1 wherein the step of sensing an occurrence of the second predetermined condition comprises the step of sensing an input at another input device connected to the computing system.

12. The method set forth in claim 11 wherein the step of sensing an input at another input device comprises sensing actuation of a key at a keyboard device.

13. Apparatus for creating a virtual push button comprising a touch sensitive orthogonal data field input device connected to a computing system in which a touch action at the device generates a stream of data to the computing system related to a first location within a field of the touch action, the orthogonal data field input device including sensing means for sensing the onset of a first touch action at the first location and for monitoring continuity thereof; and the computing system including a second condition sensing means for sensing an occurrence of a second predetermined condition; and, computing means for generating the virtual push button upon a concurrence of touch action continuation and the second predetermined condition.

14. The apparatus set forth in claim 13 wherein the second condition sensing means includes means for sensing an onset of a second touch action at the device.

15. The apparatus set forth in claim 14 wherein the means for sensing an onset of a second touch action at the device includes processing means for determining a direction of the second touch action relative to the first location of the first touch action and wherein the virtual push-button is generated as a function of the determined direction.

16. The apparatus set forth in claim 14 wherein the means for sensing an onset of a second touch action at the device includes processing means for determining a distance of the second touch action from the first location of the first touch action and wherein the virtual push-button is generated as a function of the determined distance.

17. The apparatus set forth in claim 16 wherein the processing means for determining a distance of the second touch action from the first location of the first touch action is determines and records orthogonal coordinates of the first location of the first touch action; determines and records orthogonal coordinates of a second location of the second touch action; obtains Delta x and Delta y difference values from the orthogonal coordinates of the first and second locations; calculates a factor related to Delta x and Delta y; and, compares the factor with a preestablished virtual push-button distance value.

18. The apparatus set forth in claim 13 wherein the means for sensing an occurrence of the second predetermined condition comprises timer means for detecting elapse of a predetermined time interval and untouch detecting means for detecting an untouch action at the first location after the predetermined time interval has elapsed.

19. The apparatus set forth in claim 13 wherein the means for sensing an occurrence of the second predetermined condition comprises timer means for detecting elapse of predetermined time intervals and processing means for generating and displaying to the user a sequence of virtual push-buttons with a virtual push-button being displayed during each time interval, and untouch detecting means for detecting an untouch action, a one of the sequence of virtual push buttons occurring upon detection of an untouch action at the first location during display of the one of the sequence of virtual push-buttons.

20. The apparatus set forth in claim 13 wherein the means for sensing an occurrence of the second predetermined condition comprises pressure sensing means for sensing actual pressure applied at the first location of the first touch action, and processing means for generating the virtual push button occurs upon comparison of sensed actual pressure with a prestored value.

21. The apparatus set forth in claim 13 wherein the means for sensing the occurrence of the second predetermined condition comprises input sensing means for sensing an input at another input device connected to the computing system.

22. The apparatus set forth in claim 21 wherein the input sensing means comprises a keyboard device.

* * * * *